United States Patent [19]

Harrington

[11] 3,930,528

[45] Jan. 6, 1976

[54] PNEUMATIC TIRE HAVING LUBRICANT CONTAINING POCKET INTEGRALLY FORMED THEREIN

[75] Inventor: Wilfred Henry Harrington, Solihull, England

[73] Assignee: Dunlop Limited, London, England

[22] Filed: May 14, 1973

[21] Appl. No.: 360,073

[30] Foreign Application Priority Data
May 23, 1972 United Kingdom............... 24123/72

[52] U.S. Cl.... 152/330 L; 152/330 RF; 152/353 R; 152/354
[51] Int. Cl.²...................... B60C 17/00; B60C 9/02
[58] Field of Search...... 152/330 R, 330 L, 330 RF, 152/354, 357, 353

[56] References Cited
UNITED STATES PATENTS

| | | | |
|---|---|---|---|
| 2,712,847 | 7/1955 | Harris............................. | 152/330 L |
| 2,987,093 | 6/1961 | Urbon............................. | 152/330 L |
| 3,143,155 | 8/1964 | Knox.............................. | 152/330 L |
| 3,444,918 | 5/1969 | Goggins.......................... | 152/330 L |
| 3,610,308 | 10/1971 | McDonald....................... | 152/330 L |
| 3,739,829 | 6/1973 | Powell et al..................... | 152/330 L |

*Primary Examiner*—Drayton E. Hoffman
*Attorney, Agent, or Firm*—Stevens, Davis, Miller & Mosher

[57] ABSTRACT

A pneumatic tire comprises at least one pocket integrally formed within the tire structure. The pocket is positioned in the tire in the region of or adjacent a portion of the interior surface which contacts a second portion of the interior surface on deflation or underinflation of the tire during use.

29 Claims, 8 Drawing Figures

PNEUMATIC TIRE HAVING LUBRICANT CONTAINING POCKET INTEGRALLY FORMED THEREIN

This invention relates to pneumatic tires and methods of manufacture thereof.

Upon partial or complete deflation of a pneumatic tire mounted upon a wheel during running of a vehicle opposite surfaces in the interior of the tire and wheel assembly come into contact with one another under more or less load according to whether or not the deflation is complete; the regions of the interior surfaces which normally come into contact are the interior surfaces of the tire close to but radially outwardly of the rim flanges and the interior surfaces of the tire close to but laterally inwardly of the tread edge.

When the surfaces come into contact considerable heat is generated within the rubber and textile components of the tire and very rapid structural failure ensues. It has been discovered that the major source of the heat generated is caused by the relative movement of the surfaces in contact and under load and the temperature rise is particularly marked because of the high coefficient of friction of dry rubber to dry rubber.

This disadvantage may be reduced or obviated by the use of lubricant in enclosing means which are rupturable on deflation of the tire as described in our U.S. Pat. application No. 150,627 filed June 7, 1971.

It is an object of the present invention to provide a tire with improved means for retaining lubricant or lubricant sachets in a desired position on the interior of the tire under normal operating conditions.

It is also an object of the present invention to provide a method of manufacturing a tire having an improved means for retaining lubricant or lubricant sachets in a desired position on the interior of the tire under normal operating conditions.

According to the invention, a pneumatic tire comprises at least one pocket integrally formed within the tire structure, the pocket being positioned in the tire in the region of or adjacent to a portion of the interior surface of the tire which contacts a second portion of the interior surface of the tire upon substantial underinflation or deflation of the tire during use thereof on a wheel.

Preferably a wall of the pocket that is adjacent to said interior surface is the thinnest wall of the pocket. In addition, when the tire has a carcass reinforcement the pocket is preferably disposed between said carcass reinforcement and the interior surface of the tire.

The pocket may be positioned adjacent to a bead region of the tire, or may be positioned adjacent to but laterally inwardly of a tread edge of the tire. Preferably two pockets are provided either one adjacent to each bead region or one adjacent to but laterally inwardly each tread edge whereby unbalance of the tire is substantially obviated.

The pocket preferably extends around the whole circumference of the tire and may either be a substantially continuous annulus or an interrupted annulus, e.g. divided up into circumferentially spaced-apart compartments. When the pocket is in the form of a substantially continuous annulus, the pocket is preferably provided with one restricted portion whereby an open flow path round the annulus is prevented, the restricted portion having a greater rupture strength than a wall of the pocket whereby the wall ruptures preferentially to the restricted portion by peristaltic action.

The pocket may be filled with a lubricant composition whereby, during use of the tire on a wheel, upon substantial underinflation or deflation of the tire the thin wall adjacent to the interior surface preferentially ruptures due to impact or abrasion in the contact area. This preferably occurs after several rotations of the tire thereby reducing accidental rupture due to one or two severe deflections of the tire. Alternatively, the heat generated by the rotation may cause or assist the wall to rupture. The lubricant is thereby released onto the interior surface of the tire to reduce friction and substantially prevent overheating in the contact areas. When the pocket comprises an interrupted annulus, different ingredients or mixtures of ingredients of a lubricant composition, e.g. as disclosed in our U.S. Pat. Application No. 353,937 filed Apr. 24, 1973, now U.S. Pat. No. 3,850,217 and our U.S. Pat. application No. 353,938 filed Apr. 24, 1973, can each be located in a separate compartment.

Preferably in order to minimize damage to the tire on deflation, the pocket can be provided with at least one permanent opening between the interior of the pocket and the interior of the tire. A sachet, containing a lubricant composition, of elongated form can be inserted through the opening to be positioned in the pocket. Thus, when deflation occurs during use of the tire on a wheel the sachet is ruptured in a manner similar to that described in connection with the pocket and the lubricant composition released through the opening. It is to be preferred that a plurality of openings and sachets are used, the sachets being of sufficient length such that each end thereof is positioned adjacent to an opening. The sachets are preferably constructed to be stronger at their center than at their ends, e.g. by being thicker and/or cord reinforced at the center thereof, whereby on deflation of the tire during use, at least one end of a sachet ruptures releasing the lubricant composition via the opening adjacent the ruptured end to the interior surface of the tire. Use of a plurality of sachets enables separate storage of the ingredients of a lubricant composition such as described in our U.S. patent application No. 353,937 filed Apr. 24, 1973 and U.S. patent application No. 353,938 filed Apr. 24, 1973.

The pocket may be positioned in a bead region of the pocket and the opening in this case may comprise a slot extending over the circumferential length of the pocket in the radially-outermost part of the pocket whereby at least one lubricant composition container having a means for retaining it in the pocket can be located in the pocket.

According to a further aspect of the invention, a method of manufacturing a pneumatic tire comprises locating on a tire building former at least two layers of material, at least one band of anti-adhesive material being provided between said two layers and extending in a circumferential direction in a position such that on substantial underinflation or deflation of the complete tire, during use thereof on a wheel, the portion of the interior surface of the tire adjacent to the band contacts a second portion of the interior surface of the tire, applying tire components to the two layers to complete the tire and shaping, moulding and vulcanising the tire so completed, whereby the band of anti-adhesive material substantially prevents the material of the two layers adhering together in the region of the band to form a pocket within the tire structure.

The position of the band of anti-adhesive material on a surface of a layer may be adjacent the position of a bead region of the tire being built on the former or adjacent to but axially inwardly of the position of a tread edge on the former. Preferably two bands of anti-adhesive material are applied to a surface of a layer substantially symmetrically with respect to the mid-circumferential plane of the layer, and positioned either adjacent the bead region positions or adjacent the tread edge positions whereby unbalance of the tire is substantially obviated.

Either of the two layers, i.e., the first and/or the second layer, may comprise an air-impervious rubber inner liner of the tire as is known in the art especially in so-called tubeless tires.

The first layer may comprise at least one strip of material, the width of the band of anti-adhesive material being such that at least one lateral edge of the strip is devoid of anti-adhesive material, the second layer comprising an air-impervious inner liner.

Alternatively, the second layer may comprise at least one strip of material, the width of the band of adhesive material being such that the edges of the strip are devoid of anti-adhesive material, both of said layers comprising air-impervious material.

In a further alternative, either of the at least two layers may comprise at least one strip of material, the band of anti-adhesive material being applied to substantially the whole surface of one side of the strip, the adhering of the strip to the other layer to form a pocket being achieved by folding the edges of the strip towards the surface covered with anti-adhesive material, the reverse surface of the strip, at each edge of the strip, being contacted to the other layer and adhering thereto.

The band of anti-adhesive material may be applied substantially continuously around the circumference of the tire. Preferably one portion of the surface of a layer is, around the circumference where the anti-adhesive material is applied, substantially devoid of anti-adhesive material whereby the pocket is formed with a restricted portion thereby preventing an open flow path round the pocket, said restricted portion having a greater rupture strength than a wall of the pocket. Alternatively, the band may be applied at spaced-apart intervals around the circumference of the tire whereby in the finished tire the pocket comprises at least two compartments.

Examples of suitable anti-adhesive materials are silicone preparations, e.g. mould release liquids; butyl rubber (solution or strip form); nylon strip; wax-like materials or combinations of materials which produce a non-compatible compound in relation to the compounds used in the tire and to which the material is applied; and resins or solutions thereof.

The band of anti-adhesive material may be applied to a layer of material on the former or, alternatively, may be applied to a layer prior to location thereof on the former. It may be applied by brushing or when in solution form or it may be applied in the form of a strip of material. When the anti-adhesive material is in the form of a strip, preferably the strip has some degree of elasticity to allow for movement during the shaping of the tire after completion of the building thereof on the former.

In further alternative forms, the band of anti-adhesive material may comprise a preformed tube of material whereby the interior of the tube forms the pocket; or may comprise a strip of foamed material or material capable of foaming, e.g. during vulcanization, whereby the pocket when formed is filled with foam into which the lubricant may be introduced.

The method also includes the step of providing at least one permanent opening in the pocket whereby the interior of the pocket and the interior of the tire communicate one with another. Such openings may be provided by cutting them in a first layer either before or after location of the layer on the building former or preferably after the tire has been moulded. The method may include the step of providing a moulding diaphragm with at least one protrusion in a position such that during moulding of the tire the protrusion is adjacent the interior of the tire where the opening is or is to be cut in the first layer and thus causes the material of the layer adjacent that point to remain out of the opening or to have a depression and be thinner than the material surrounding the depression allowing easier cutting of the opening in the layer. Where such an opening is provided in the pocket it is necessary for either the second layer to comprise the air-impervious inner liner or, if the first layer is air-impervious for the second layer at least in the region where the pocket is formed to be of air-impervious material.

The method also includes the step of inserting a cord within the band of anti-adhesive material to assist in threading sachets into the pocket.

The cross-sectional area of the pocket may be increased by providing the diaphragm with a circumferential protrusion which during moulding causes a depression on the interior surface of the tire which the first layer covers. An alternative means of increasing the cross-sectional area of the pocket is to use a first layer comprising a cord reinforced strip, the lateral edges of which are positioned such that the distance between them is less than the width of the strip thereby forming the pocket with an increased cross-sectional area.

The method of the invention also provides the step of injecting a lubricant composition into the pocket or when at least one opening is formed inserting a lubricant sachet of elongated form into the opening.

The invention will now be described by way of example only with reference to the accompanying drawings, of which:

Figure 1:
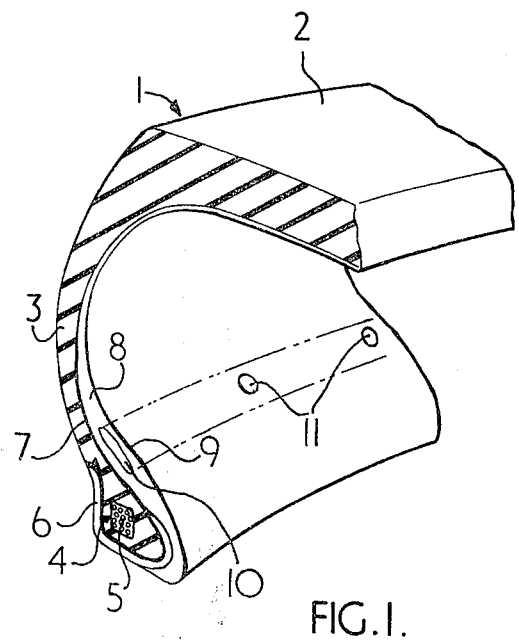
FIG. 1 shows a diagrammatic sectional view of part of a first example of a tire in accordance with the invention.

In FIG. 1, the tire 1 has a tread 2, sidewalls 3 and bead regions 4. The bead regions 4 are each provided with a bead core 5 and a chafer strip 6. The carcass reinforcement 7 is of rubberized parallel cord fabric the cords of which are preferably disposed radially of the tire 1.

Figure 7:
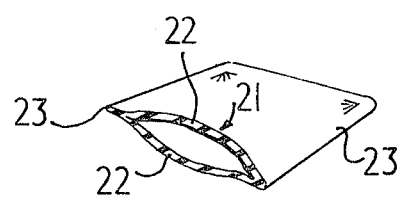
FIG. 7 shows a perspective longitudinal cross-sectional view of a sachet suitable for insertion in a pocket provided with holes.

An air-impervious inner liner 8 is provided on the interior surface of the tire 1 which together with a strip 9 of material forms a pocket 10. In this particular tire 1, openings 11 are provided so that the interior of the pocket 10 and of the tire 1 are in communication. Sachets 21 containing a lubricant composition, an example of which is shown in FIG. 7, are inserted in the pocket 10 so that each end 23 of a sachet 21 is adjacent to opening 11.

Figure 2:
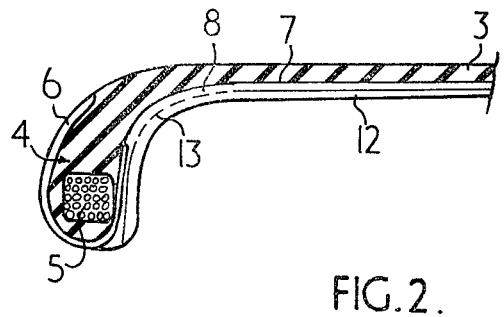
FIG. 2 shows a diagrammatic sectional view of part of a tire as it would appear when positioned on a building former of a second example of a tire.

In FIG. 2, part of a tire 1 is shown in the position it would occupy on a building former (not shown). In this example a first layer of rubber composition 12 extending from bead to bead is positioned on the former and a band of anti-adhesive material is applied thereto in the region 13 shown in dotted lines adjacent to each bead region 4 (only one of which is shown). An air-impervious layer 8 is then positioned over the layer 12 and the various other tire components are built-up around the layer 8.

Figure 3:
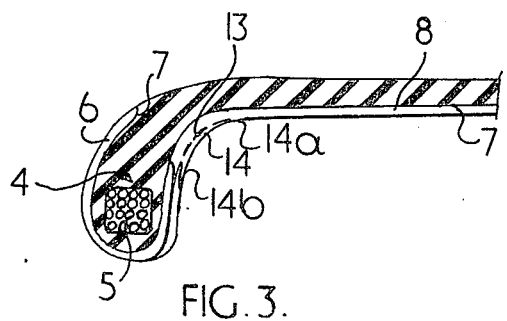
FIG. 3 shows a view similar to FIG. 2 of the first example of a tire.

In FIG. 3, in which the flat built tire 1 is partially shown, a strip 14 of material is used in each bead region 4, the band of anti-adhesive material shown again in dotted line 13. The lateral edges 14a and 14b of the strip 14 are devoid of the anti-adhesive material. The strip 14 is shown in FIG. 1 as strip 9 in the finished tire.

Figure 4:
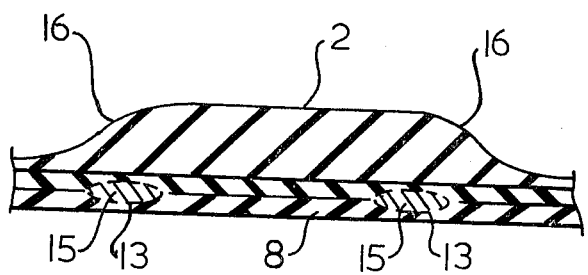
FIG. 4 shows a view similar to FIG. 2 of a third example of a tire, the pockets being positioned adjacent the tread edges.

In the third example shown in FIG. 4, strips 15 of material are used. The inner liner 8 is positioned on the former and two bands of anti-adhesive material (as shown by dotted lines 13) are applied thereto. The widths of the bands is such that on application of the strips 15 adjacent to but laterally inwardly of the tread edges 16 the lateral edges thereof do not contact the bands. In this example, if openings similar to the holes 11 shown in FIG. 1, are made in the inner liner the strips 15 will have to be made from air-impervious material.

Figure 5:
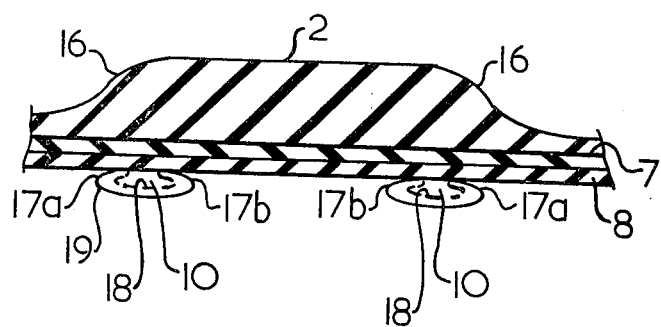
FIG. 5 shows a view similar to FIG. 4 of a fourth example of a tire.

In the fourth example shown in FIG. 5, strips of material 17 are provided on surfaces 18 thereof with anti-adhesive material (shown in dotted lines). The edges 17a and 17b of the strips 17 are then folded towards the surfaces 18 and located on the layer 8 adjacent the position of the tread edges 16. The reverse surface 19 causes the strips 17 to be adhered in position on vulcanization. This is one method of increasing the cross-sectional area of the pocket 10.

Figure 6:
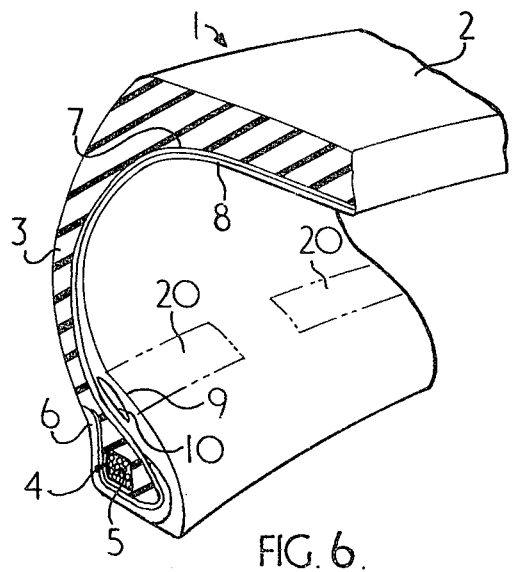
FIG. 6 shows a view similar to FIG. 1 of a variation of a tire in accordance with the invention.

Referring to FIG. 6, the overall tire construction is similar to that described in FIG. 1. However, the band of anti-adhesive material was, during manufacture of the tire, only applied at intervals around the circumference thereof resulting in the pocket 10 being divided into compartments 20. The openings 11, shown in FIG. 1, have not been applied to the tire shown in FIG. 6. The compartments can each contain an ingredient of a lubricant composition as hereinbefore described.

In FIG. 7 is shown an example of a sachet 21 that could be used with a tire of the invention. As can be seen from the cross-section the center portions 22 are thicker than the ends 23 whereby on deflation of a tire during use thereof, the ends 23 would rupture in preference to the center 22 of the sachet 21. Thus the lubricant composition contained in the sachets 21 would be released adjacent to holes 11. In an alternative construction (not shown) sachets 21 may be cord reinforced at their centers 22 and not at their ends 23.

Figure 8:
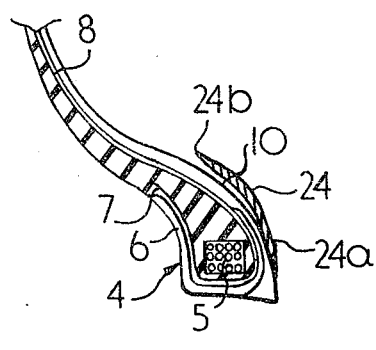
FIG. 8 shows a diagrammatic sectional view of a tire bead region of a fifth example of a tire.

The fifth example as shown in FIG. 8 comprises a bead region 4 of construction similar to that hereinbefore described. However, a strip 24 is provided on the interior surface of the bead region 4, only one lateral edge 24a of the strip 24 being devoid of anti-adhesive material during building thereof on the building former. The other lateral edge 24b of the strip 24 is, in the finished tire, free of the interior surface and allows free access to the pocket 10. In this example, in order that sachets 21 are retained in the pocket 10 against centrifugal force during use of the tire 1, it is preferred that a number of sachets 21 form an endless chain, each joined to an adjacent sachet 10 by their ends 23. It may also be preferred that one circumferential edge of such an endless chain may be attached to an inextensible retaining means, for example, a wire hoop fitted in the pocket.

Having now described my invention, what I claim is:

1. A pneumatic tire comprising a carcass, a tread portion, two sidewall portions each terminating in a bead region, and at least one of said sidewall portions comprising two transversely spaced layers of material which define therebetween at least one pocket integrally entirely within the tire structure, a lubricant composition in said pocket, the pocket being positioned in the tire in the region of a portion of the interior surface of the tire which contacts a second portion of the interior surface of the tire upon substantial underinflation or deflation of the tire during use thereof on a wheel such that the lubricant composition in said pocket is releasable therefrom onto the interior surface of the tire.

2. A pneumatic tire according to claim 1 wherein a wall of the pocket that is adjacent to said interior surface is the thinnest wall of the pocket.

3. A pneumatic tire according to claim 1 wherein the pocket is positioned adjacent to one of the bead regions of the tire.

4. A pneumatic tire according to claim 3 wherein two pockets are defined within the tire structure, one being disposed adjacent to each bead region of the tire.

5. A pneumatic tire according to claim 1 wherein the pocket is filled directly with the lubricant composition.

6. A pneumatic tire according to claim 1 wherein the pocket is rupturable during use thereof on a wheel, upon substantial underinflation or deflation of the tire, by impact or abrasion in the portions of the interior surface of the tire which come into contact.

7. A pneumatic tire according to claim 1 wherein the pocket is rupturable during use thereof on a wheel, upon substantial underinflation or deflation of the tire, by heat generated between the portions of the interior surface of the tire which come into contact, upon rotation of the tire and wheel.

8. A pneumatic tire according to claim 1 wherein said means defines at least two pockets, at least one ingredient of the lubricant composition being located in a separate pocket from a second ingredient.

9. A pneumatic tire comprising a carcass, a tread portion, two sidewall portions each terminating in a bead region, and at least one of said sidewall portions comprising two transversely spaced layers of material which define therebetween at least one pocket integrally within the tire structure, a lubricant composition in said pocket, the pocket being positioned in the tire in the region of a portion of the interior surface of the tire which contacts a second portion of said surface upon substantial underinflation or deflation of the tire during use thereof on a wheel such that the lubricant composition in said pocket is releasable therefrom onto said surface, at least one permanent opening being provided between the pocket interior and the tire interior, the lubricant composition being in said pocket in separate containing means.

10. A pneumatic tire according to claim 9 wherein the separate containing means is rupturable during use thereof on a wheel, upon substantial underinflation or deflation of the tire, by impact or abrasion in the portions of the interior surface of the tire which come into contact.

11. A pneumatic tire according to claim 9 wherein the separate containing means is rupturable during use thereof on a wheel, upon substantial underinflation or deflation of the tire, by heat generated between the portions of the interior surface of the tire which come into contact, upon rotation of the tire and wheel.

12. A pneumatic tire according to claim 9 wherein at least two separate containing means are located in said pocket, at least one ingredient of the lubricant composition being located in a separate containing means from a second ingredient.

13. A pneumatic tire according to claim 9 wherein the separate containing means comprises at least one sachet of elongated form located in the pocket by insertion through said opening.

14. A pneumatic tire according to claim 9 wherein a plurality of openings are provided in the pocket, the separate containing means comprising a plurality of sachets in the pocket, the sachets being of a length such that each end of each sachet is adjacent an opening in the pocket.

15. A pneumatic tire according to claim 13 wherein the sachet is rupturable by peristaltic action.

16. A pneumatic tire comprising a carcass, a tread portion, two sidewall portions each terminating in a bead region, said tread portion comprising two radially spaced layers of material which define therebetween at least one pocket integrally entirely within the tire structure, said pocket being positioned adjacent to but laterally inwardly of an edge of the tread, a lubricant composition in said pocket, the pocket being positioned in the tire in the region of a portion of the interior surface of the tire which contacts a second portion of the interior surface of the tire upon substantial underinflation or deflation of the tire during use thereof on a wheel such that the lubricant composition in said pocket is releasable therefrom onto the interior surface of the tire.

17. A pneumatic tire according to claim 16 wherein two pockets are defined within the tire structure, one being disposed adjacent to but laterally inwardly of each tread edge of the tire.

18. A pneumatic tire comprising a carcass, a tread portion, two sidewall portions each terminating in a bead region, and at least one pocket integrally formed within the tire structure and in which a lubricant composition can be located, the pocket being positioned in the tire in the region of a portion of the interior surface of the tire which contacts a second portion of said surface upon substantial underinflation or deflation of the tire during use thereof on a wheel such that a lubricant composition located in said pocket is releasable therefrom onto said surface, at least one permanent opening being provided between the pocket interior and the tire interior, the lubricant composition being locatable in said pocket in separate containing means, said separate containing means comprises at least one sachet of elongated form located in the pocket by insertion through said opening, and said sachet is stronger at the center than at the ends thereof whereby said sachet can be preferentially ruptured at at least one end, the lubricant composition thereby being released adjacent an opening in the pocket.

19. A pneumatic tire according to claim 18 wherein said sachet is thicker at the center than at the ends thereof.

20. A pneumatic tire according to claim 18 wherein said sachet is cord reinforced at the center thereof.

21. A pneumatic tire comprising a carcass, a tread portion and two sidewall portions each terminating in a bead region, the tire forming a single inflation chamber with a wheel when mounted thereon during use, at least one of said sidewall portions comprises two transversely spaced layers of material which define therebetween at least one pocket integrally entirely within the tire structure, a lubricant composition in said pocket, the pocket being positioned in the tire in the region of a portion of the interior surface of the tire which contacts a second portion of the interior surface of the tire upon substantial underinflation or deflation of the tire during use thereof on the wheel such that the lubricant composition in said pocket is releasable therefrom onto the interior surface of the tire.

22. A pneumatic tire comprising a carcass having at least one carcass reinforcement, a tread portion and two sidewall portions each terminating in a bead region, at least one of said sidewall portions comprises two transversely spaced layers of material which define therebetween at least one pocket integrally entirely within the tire structure, a lubricant composition in said pocket, the pocket being positioned in the tire between the interior surface of the tire and said carcass reinforcement and in the region of a portion of said surface which contacts a second portion of the said surface upon substantial underinflation or deflation of the tire during use thereof on a wheel such that the lubricant composition in said pocket is releasable therefrom onto the interior surface of the tire.

23. A pneumatic tire according to claim 22 wherein the tire forms a single inflation chamber with a wheel when mounted thereon during use.

24. A pneumatic tire comprising a carcass, a tread portion and two sidewall portions each terminating in a bead region, the tire forming a single inflation chamber with a wheel when mounted thereon during use, at least one of said sidewall portions comprises two transversely spaced layers of material which define therebetween at least one pocket integrally entirely within the tire structure, a lubricant composition in said pocket, the pocket being positioned in the tire in the region of a portion of the interior surface of the tire which contacts a second portion of the interior surface of the tire upon substantial underinflation or deflation of the tire during use thereof on a wheel such that the lubricant composition in said pocket is releasable therefrom onto the interior surface of the tire, the pocket being provided with at least one permanent opening between the interior of the pocket and the interior of the tire, the lubricant composition being locatable therein in separate containing means.

25. A pneumatic tire according to claim 24 wherein the carcass comprises at least one carcass reinforcement, the pocket being disposed between the reinforcement and the interior surface of the tire.

26. A pneumatic tire comprising a carcass, a tread portion, two sidewall portions each terminating in a bead region, and at least one of said sidewall portions comprising two transversely spaced layers of material which define therebetween at least one pocket integrally within the tire structure, a lubricant composition in said pocket, the pocket being positioned in the tire in the region of a portion of the interior surface of the tire which contacts a second portion of said surface upon substantial underinflation or deflation of the tire during use thereof on a wheel such that the lubricant composition in said pocket is releasable therefrom onto said surface, said pocket being substantially annular and extending around the circumference of the tire, and having a restricted portion of greater rupture strength than a wall of the pocket whereby the wall ruptures preferentially to the restricted portion.

27. A pneumatic tire according to claim 26 wherein a plurality of restricted portions are provided in said pocket to form circumferentially spaced-apart compartments.

28. A pneumatic tire according to claim 27 wherein at least on ingredient of the lubricant composition is located in a compartment separate from that in which a second ingredient is located.

29. A pneumatic tire comprising a carcass, a tread portion, two sidewall portions each terminating in a bead region, means defining at least one pocket integrally within the tire structure in a bead region of the tire, a lubricant composition in said pocket, the pocket being positioned in the tire in a region of a portion of the interior surface of the tire which contacts a second portion of said surface upon substantial underinflation or deflation of the tire during use thereof on a wheel such that the lubricant composition in said pocket is releasable therefrom onto said surface, at least one permanent opening being provided between the pocket interior and the tire interior, the lubricant composition being in said pocket in at least one lubricant composition container in the pocket, said opening comprising a slot extending over the circumferential length of the pocket in the radially-outermost part of the pocket, and means for retaining said at least one lubricant composition container in the pocket.

* * * * *